(12) United States Patent
Liu

(10) Patent No.: US 7,996,586 B2
(45) Date of Patent: Aug. 9, 2011

(54) USB PORT FOR EMPLOYING A PLURALITY OF SELECTABLE DATA TRANSMISSION PRIORITY RULES

(75) Inventor: Meng-Fang Liu, Taipei (TW)

(73) Assignee: VIA Technologies, Inc., New Taipei (TW)

( * ) Notice: Subject to any disclaimer, the term of this patent is extended or adjusted under 35 U.S.C. 154(b) by 203 days.

(21) Appl. No.: 12/509,079

(22) Filed: Jul. 24, 2009

(65) Prior Publication Data

US 2011/0022743 A1    Jan. 27, 2011

(51) Int. Cl.
*G06F 3/00* (2006.01)
*G06F 13/00* (2006.01)
*H04J 3/02* (2006.01)

(52) U.S. Cl. .............. 710/36; 710/3; 710/38; 710/40; 710/44; 370/537; 370/540; 370/355

(58) Field of Classification Search .......... 710/3, 36, 710/38, 40, 44; 370/537, 540, 355
See application file for complete search history.

(56) References Cited

U.S. PATENT DOCUMENTS

| | | | | |
|---|---|---|---|---|
| 5,958,020 A * | 9/1999 | Evoy et al. | ........................ | 710/3 |
| 6,131,135 A * | 10/2000 | Abramson et al. | ............ | 710/113 |
| 7,685,374 B2 * | 3/2010 | Diggs et al. | .................. | 711/151 |
| 7,760,768 B2 | 7/2010 | Lee | ............................... | 370/537 |
| 7,904,620 B2 * | 3/2011 | Yao et al. | ........................ | 710/65 |

FOREIGN PATENT DOCUMENTS

EP           1102171 A2 *   5/2001

* cited by examiner

*Primary Examiner* — Tammara Peyton
(74) *Attorney, Agent, or Firm* — E. Alan Davis; James W. Huffman

(57) ABSTRACT

A USB port transmitter includes a plurality of arbiters, each employing a distinct priority rule to select one USB transmission from among multiple scheduled USB transmissions based on their types. A selector selects one of the arbiters to select the one USB transmission from among the multiple scheduled USB transmissions. A programmable storage element controls the selector to select the one arbiter. In one embodiment, at least a first arbiter prioritizes header/data packets higher than link commands, and at least a second arbiter prioritizes link commands higher than header/data packets. In one embodiment, at least one arbiter prioritizes flow control and power management link commands higher than header/data packets. In one embodiment, at least a first of the arbiters prioritizes USB LGO_Ux link commands higher than USB LAU/LXU link commands, and at least a second arbiter prioritizes USB LAU/LXU link commands higher than USB LGO_Ux link commands.

34 Claims, 3 Drawing Sheets

USB PORT FOR EMPLOYING A PLURALITY OF SELECTABLE DATA TRANSMISSION PRIORITY RULES

FIELD OF THE INVENTION

The present invention relates in general to priority scheduling for serial data link transmission, and particularly within the USB architecture.

BACKGROUND OF THE INVENTION

In recent years, the USB architecture has become a widely employed high-speed serial cable bus designed that supports data exchange between a host computer and a wide range of simultaneously accessible peripherals. The attached peripherals share USB bandwidth through a host-scheduled, token-based protocol. More specifically, the USB 3.0 architecture, specified in the USB 3.0 Specification, Revision 1.0, Nov. 12, 2008, managed and disseminated by the USB Implementers Forum, Inc., includes highly desirable features over previous USB architectures, including the SuperSpeed protocol.

According to the USB 3.0 Specification, a USB port transmitter can transmit various types of transmissions, including link commands, header packets, data packets, SKP ordered sets, Training Sequence (TS) ordered sets, and Bit Error Rate Test (BERT) ordered sets. USB devices transmit these transmissions to one another on serial links that connect ports of the USB devices. When multiple link command, header packet, data packet, and SKP ordered set transmissions are scheduled to be transmitted by a USB port in the U0 operational state (the normal operational state), an arbiter is needed to be in charge of prioritizing the transmissions to be transmitted on the USB link to which the port is connected. Sections 10.7.5 and 10.7.9 of the USB 3.0 Specification include FIGS. 10-16 and 10-18, respectively, which describe the functional requirements of a USB port transmitter state machine. From these Figures, a priority rule of scheduled transmissions that may be inferred from these sections of the USB 3.0 Specification is as follows:
1. Link Command transmissions (All Link Commands) and Skip Ordered Set (if required)—highest priority
2. Header Packet transmission (Transaction Packet (TP), Link Management Packet (LMP), and Isochronous Timestamp Packet (ITP)) and Skip Ordered Set (if required)—next highest priority
3. Data Packet transmissions and Skip Ordered Set—lowest priority The various types of transmissions referenced above are defined in the USB 3.0 Specification in the Terms and Abbreviations section on pages 2-1 to 2-7.

A USB port arbiter that determines which scheduled transmission to transmit first based on the single priority rule inferred from the USB 3.0 Specification may not exhibit good performance and transmission behavior in some circumstances.

BRIEF SUMMARY OF INVENTION

In one aspect, the present invention provides a Universal Serial Bus (USB) port transmitter for transmitting USB transmissions on a USB link. The USB port transmitter includes a plurality of arbiters, each configured to employ a distinct priority rule to select one USB transmission from among multiple scheduled USB transmissions based on the types of the multiple scheduled USB transmissions. The USB port transmitter also includes a selector, coupled to the plurality of arbiters. The selector is configured to select one of the plurality of arbiters to select the one USB transmission from among the multiple scheduled USB transmissions to transmit on the USB link. In one embodiment, a programmable storage element provides a value to the selector to control the selector to select the one of the plurality of arbiters. In one embodiment, the distinct priority rule employed by at least a first of the plurality of arbiters prioritizes header/data packet type transmissions higher than link command type transmissions, and the distinct priority rule employed by at least a second of the plurality of arbiters prioritizes link command type transmissions higher than header/data packet type transmissions. In one embodiment, the distinct priority rule employed by the at least a second of the plurality of arbiters prioritizes flow control and power management link command type transmissions higher than header/data packet type transmissions. In one embodiment, the distinct priority rule employed by at least a first of the plurality of arbiters prioritizes USB LGO_Ux link command type transmissions higher than USB LAU/LXU link command type transmissions, and the distinct priority rule employed by at least a second of the plurality of arbiters prioritizes USB LAU/LXU link command type transmissions higher than USB LGO_Ux link command type transmissions.

In another aspect, the present invention provides a method for a USB port to transmit USB transmissions on a USB link. The method includes selecting one priority rule from among a plurality of distinct priority rules. Each of the plurality of distinct priority rules includes a distinct priority for each of a plurality of USB transmission types. The method also includes using the selected one of the plurality of distinct priority rules to select one USB transmission from among multiple scheduled USB transmissions for transmission on the USB link.

In another aspect, the present invention provides a USB port transmitter for transmitting USB transmissions on a USB link. The USB port transmitter includes a first plurality of arbiters, each configured to employ a distinct priority rule to select one USB link command transmission from among multiple scheduled USB link command transmissions based on the types of the multiple scheduled USB link command transmissions. The USB port transmitter also includes a first selector, coupled to the first plurality of arbiters. The first selector is configured to select one of the first plurality of arbiters to select the one USB link command transmission. The USB port transmitter also includes a second plurality of arbiters, each configured to employ a distinct priority rule to select one USB transmission from among multiple scheduled USB transmissions based on the types of the multiple scheduled USB transmissions. The multiple scheduled USB transmissions include the one USB link command transmission selected by the first selector and multiple header/data packet transmissions. The USB port transmitter also includes a second selector, coupled to the second plurality of arbiters. The second selector is configured to select one of the second plurality of arbiters to select the one USB transmission from among the multiple scheduled USB transmissions to transmit on the USB link.

In another aspect, the present invention provides a method for a USB port to transmit USB transmissions on a USB link. The method includes selecting one priority rule from among a first plurality of distinct priority rules. Each of the first plurality of distinct priority rules includes a distinct priority for each of a plurality of USB link command transmission types. The method also includes using the selected one of the first plurality of distinct priority rules to select one USB link command transmission from among multiple scheduled USB link command transmissions. The method also includes selecting one priority rule from among a second plurality of distinct priority rules. Each of the second plurality of distinct priority rules includes a distinct priority for each of a plurality of USB transmission types. The method also includes using the selected one of the second plurality of distinct priority rules to select one USB transmission from among multiple scheduled USB transmissions to transmit on the USB link. The multiple scheduled USB transmissions include the selected one USB link command transmission and multiple header/data packet transmissions.

DETAILED DESCRIPTION OF THE INVENTION

The present specification describes embodiments that potentially provide improved performance and transmission characteristics by providing a USB port transmitter that defines a plurality of priority rules for scheduling transmissions. Furthermore, the USB port transmitter may employ a multi-level approach to the plurality of priority rules. The USB port transmitter includes one or more programmable control registers that choose from among the plurality of priority rules to be used to select the next transmission to transmit on the USB link. Each priority rule, or combination thereof, may provide improved performance in a corresponding specific transmission pattern. The ability to select from among multiple priority rules provided by the present invention potentially improves performance over a conventional USB port transmitter that employs a single priority rule, such as the priority rule inferred above from the USB 3.0 Specification.

Figure 1:
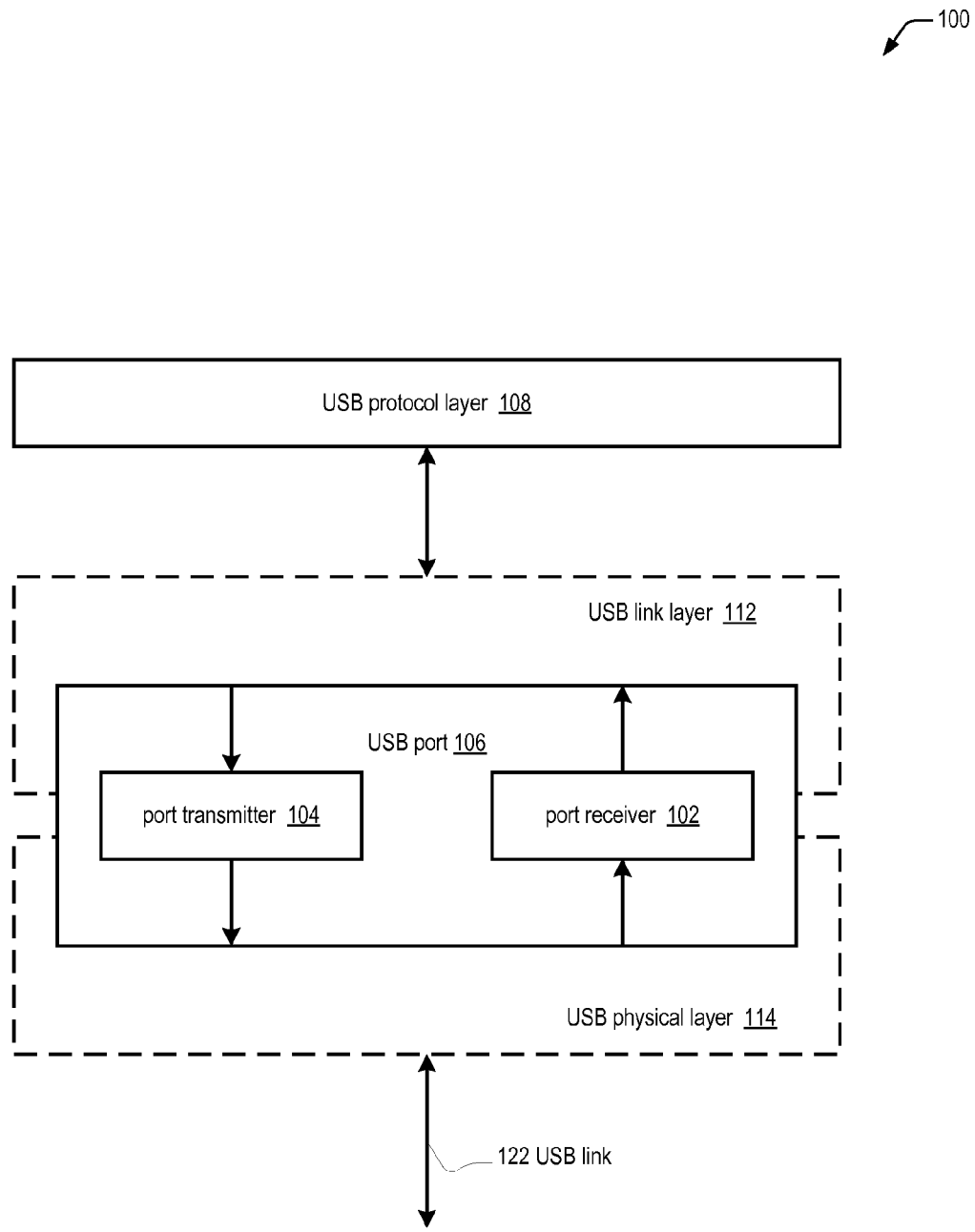
FIG. 1 is a block diagram illustrating a USB device according to the present invention.

Referring now to FIG. 1, a block diagram illustrating a USB device 100 according to the present invention is shown. The USB device 100 may be included within a USB host, USB hub, or USB peripheral device. The USB device 100 includes a USB protocol layer 108 in communication with a USB link layer 112. The USB link layer 112 is in communication with a USB physical layer 114. The USB device 100 includes a USB port 106, which includes a port transmitter 104 and port receiver 102. The link layer 112 comprises a logical portion of the USB port 106, and the physical layer 114 comprises a physical portion of the USB port 106. The USB protocol layer 108 and USB link layer 112 collectively generate USB transmissions (i.e., USB ordered sets, link commands, and header/data packets) to be transmitted by the USB port transmitter 104 to its link partner at the other end of the USB link 122. Advantageously, the USB port transmitter 104 of FIG. 1 according to the present invention is modified relative to a conventional USB port transmitter 104 such that the USB port transmitter 104 of FIG. 1 is capable of employing one of a plurality of different priority rules for selecting a transmission from among multiple scheduled transmissions, and the particular priority rule used to select the transmission is itself selectable. Advantageously, the particular priority rule used to select the transmission is dynamically selectable during operation of the USB device 100 within a system by programming a control register that specifies the priority rule to be used.

Although some of the elements of FIG. 1 are described as logical entities, they are embodied in hardware circuits to perform the functions described herein, which according to some embodiments, may be performed in part by stored programs executing on one or more programmable processors.

Figure 2:
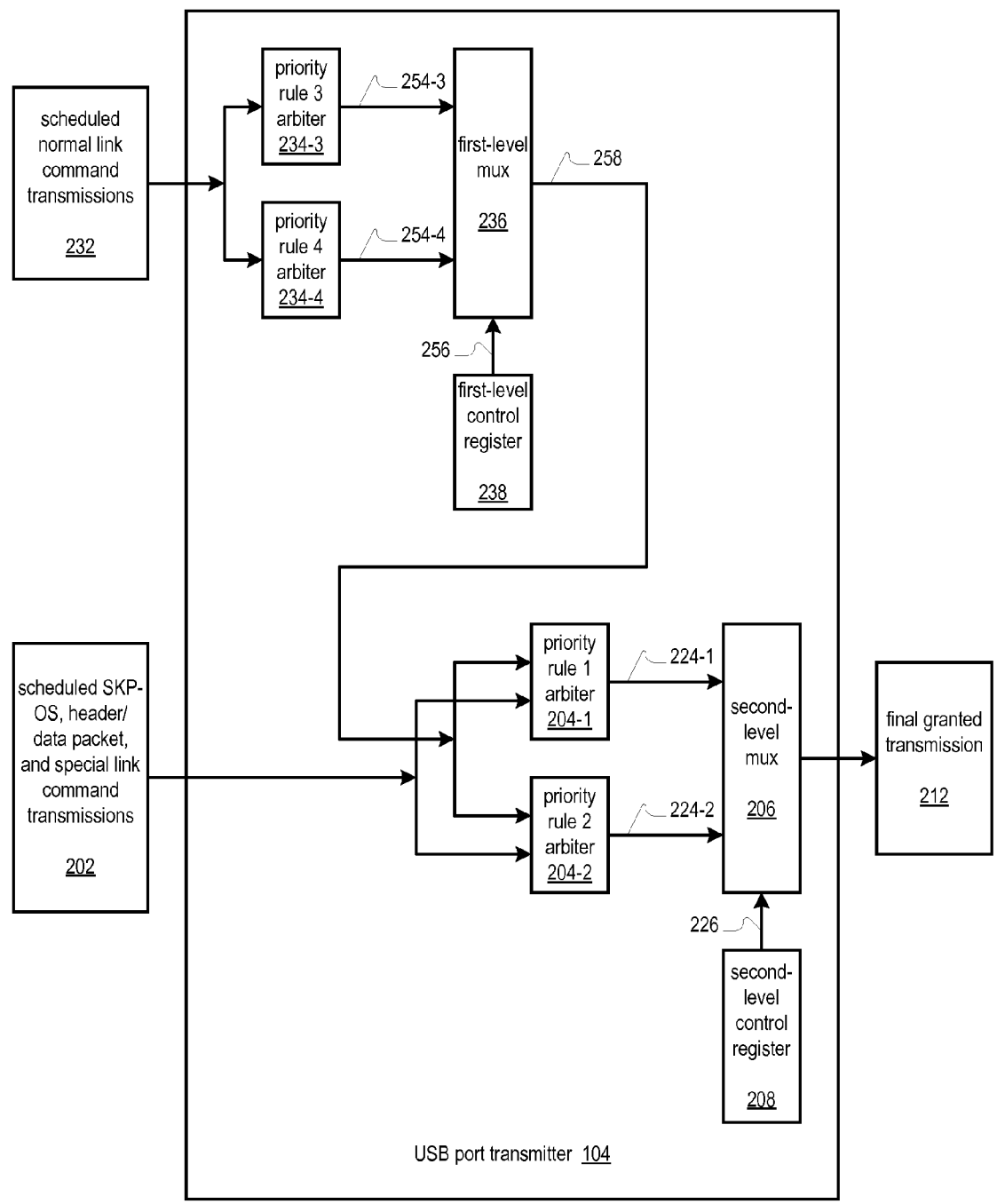
FIG. 2 is a block diagram illustrating a portion of the USB device of FIG. 1, and particularly the USB port transmitter of FIG. 1, according to the present invention.

Referring now to FIG. 2, a block diagram illustrating a portion of the USB device 100 of FIG. 1, and particularly the USB port transmitter 104 of FIG. 1, according to the present invention is shown. The USB device 100 includes a pool of scheduled USB SKP ordered set (SKP-OS), header/data packet, and special link command transmissions 202. The USB special link command type includes the LUP link command described in sections 7.2.2.2 and 7.5.6.1 of the USB 3.0 Specification, which is sent by an upstream port every 10 microseconds when there are no packets or other link commands to be transmitted, and which may only be transmitted in the U0 operational state. The USB special link command type also includes the LDN link command described in Engineering Change Notice of the USB 3.0 Specification in Apr. 4, 2009, which is sent by a downstream port every 10 microseconds when there are no packets or other link commands to be transmitted, and which may only be transmitted in the U0 operational state. USB SKP ordered set and header/data packet transmissions are also described in detail in the USB 3.0 Specification. The USB device 100 also includes a pool of scheduled USB normal link command transmissions 232. The USB normal link command transmission types include the LGOOD_n, LBAD, LCRD_x, LGO_Ux, LAU, LXU, and LPMA link commands described in detail in the USB 3.0 Specification. In one embodiment, LRTY type link commands inherit the same priority as their associated header packet re-transmissions. The pools of scheduled transmissions 202 and 232 comprise the USB transmissions that are ready to be transmitted on the USB link 122. In one embodiment, each pool of scheduled transmissions 202 and 232 comprises a plurality of queues of scheduled transmissions each of a different transmission type. Specifically, the different transmission types associated with the queues correspond to the various transmission types differentiated by the plurality of priority rules discussed below. Thus, for example, according to one embodiment, a different queue exists within the pool 232 for each of the normal link command transmission types specified in Tables 3/4 below, and a different queue exists within the pool 202 for each of the USB transmission types specified in Tables 1/2 below, except that there is not a queue for the normal link command transmission type, since the queues for the normal link commands are within the pool 232 and the granted normal link command 258 is received from the first-level multiplexer 236. In one embodiment, the transmissions within a queue are transmitted on a first-in-first-out basis relative to transmissions of the same type.

The USB port transmitter 104 includes a plurality of first-level priority rule arbiters 234-3 and 234-4, referred to collectively as first-level priority rule arbiters 234, or first-level arbiters 234. Each of the first-level arbiters 234 is capable of viewing the contents of the pool of scheduled normal link command transmissions 232. Each of the first-level arbiters 234 selects one transmission from the pool of scheduled normal link command transmissions 232 according to the priority rule associated with the respective first-level arbiter 234. According to one embodiment: first-level arbiter 234-3 employs Priority Rule 3 of Table 3 and arbiter 234-4 employs Priority Rule 4 of Table 4. Each first-level arbiter 234 outputs the selected normal link command on its respective output 254-3 and 254-4, referred to collectively as 254.

The USB port transmitter 104 also includes a 2-to-1 first-level multiplexer 236. The first-level multiplexer 236 receives on its two inputs the two outputs 254-3 and 254-4. A first-level control register 238 provides a first-level control signal 256 to a control input of the first-level multiplexer 236 to control selection of which input 254 is provided on the first-level multiplexer 236 output as the granted normal link command transmission 258. In one embodiment, the first-level control register 238 is a 1-bit register capable of holding a value that selects one of the first-level arbiter 234 outputs 254. In one embodiment, the first-level control register 238 is programmable, as discussed below with respect to FIG. 4, to enable dynamic selection of the one of the plurality of priority rules during operation of the USB device 100.

The USB port transmitter 104 includes a plurality of second-level priority rule arbiters 204-1 and 204-2, referred to collectively as second-level priority rule arbiters 204, or second-level arbiters 204. Each of the second-level arbiters 204 is capable of viewing the contents of the pool of scheduled transmissions 202 as well as the granted normal link command 258. Each of the second-level arbiters 204 selects one transmission from the granted normal link command 258 and the pool of scheduled transmissions 202 for transmission on the USB link 122 according to the priority rule associated with the respective second-level arbiter 204. According to one embodiment: second-level arbiter 204-1 employs Priority Rule 1 of Table 1 and second-level arbiter 204-2 employs Priority Rule 2 of Table 2. Each second-level arbiter 204 outputs the selected transmission on its respective second-level output 224-1 and 224-2, referred to collectively as 224.

The USB port transmitter 104 also includes a 2-to-1 second-level multiplexer 206. The second-level multiplexer 206 receives on its two inputs the two outputs 224-1 and 224-2. A second-level control register 208 provides a second-level control signal 226 to a control input of the second-level multiplexer 206 to control selection of which input 224-1 or 224-2 is provided on the second-level multiplexer 206 output as the final granted transmission 212, i.e., as the transmission that will be transmitted on the USB link 122. In one embodiment, the second-level control register 208 is a 1-bit register capable of holding a value that selects one of the second-level arbiter 204 outputs 224. In one embodiment, the second-level control register 208 is programmable, as discussed below with respect to FIG. 4, to enable dynamic selection of the one of the plurality of priority rules during operation of the USB device 100.

Tables 1 through 4 shown below specify the four priority rules used by the four priority rule arbiters 204 of FIG. 2 according to one embodiment. With reference to Tables 1 through 4 below, priority 1 is the highest priority and priority 4 is the lowest priority. SKP ordered sets are described in section 6.3.5 on page 6-8, Table 6-1 of the USB 3.0 Specification; header/data packets are described in the Terms and Abbreviation section on pages 2-1 to 2-7 of the USB 3.0 Specification; normal link commands (LGOOD_n, LBAD, LCRD_x, LGO_Ux, LAU, LXU, LPMA, LTRY) and special link commands (LUP, LDN) are described in section 7.2.2.2 on pages 7-11 to 7.14 of the USB 3.0 Specification.

TABLE 1

Priority Rule 1.

| Priority | Transmission Type |
|---|---|
| 1 | SKP ordered sets |
| 2 | Normal link commands (flow control [LGOOD_n, LBAD, LCRD_x] and power management [LGO_Ux, LAU, LXU, LPMA]) |
| 3 | Header/Data packets |
| 4 | Special link commands (LUP or LDN) |

TABLE 2

Priority Rule 2.

| Priority | Transmission Type |
|---|---|
| 1 | SKP ordered sets |
| 2 | Header/Data packets |
| 3 | Normal link commands (flow control [LGOOD_n, LBAD, LCRD_x] and power management [LGO_Ux, LAU, LXU, LPMA]) |
| 4 | Special link commands (LUP or LDN) |

TABLE 3

Priority Rule 3.

| Priority | Normal Link Command Type |
|---|---|
| 1 | LGOOD_n |
| 2 | LBAD |
| 3 | LCRD_x |
| 4 | LGO_Ux |
| 5 | LAU/LXU |
| 6 | LPMA |

TABLE 4

Priority Rule 4.

| Priority | Normal Link Command Type |
|---|---|
| 1 | LGOOD_n |
| 2 | LBAD |
| 3 | LCRD_x |
| 4 | LAU/LXU |
| 5 | LGO_Ux |
| 6 | LPMA |

In one embodiment, Priority Rules 1 and 3 are the default priority rules.

Figure 3:
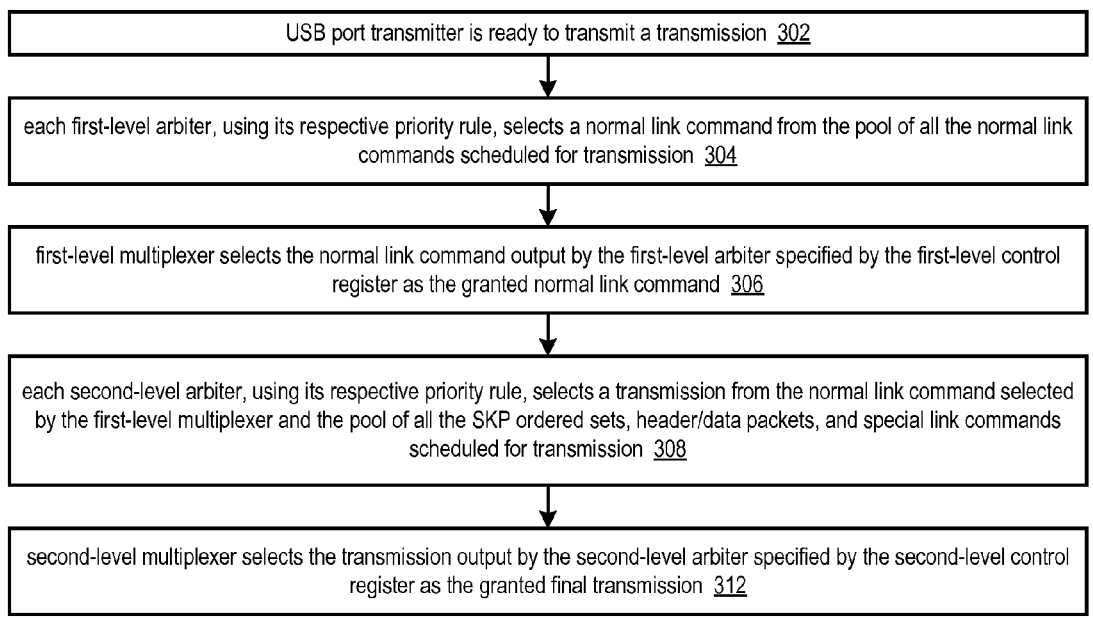
FIG. 3 is a flowchart illustrating operation of the USB port transmitter of FIG. 2 according to the present invention.

Referring now to FIG. 3, a flowchart illustrating operation of the USB port transmitter 104 of FIG. 2 according to the present invention is shown. Flow begins at block 302.

At block 302, the USB port transmitter 104 is ready to transmit a transmission from the pool of scheduled SKP ordered set, header/data packet, and special link command transmissions 202 and from the pool of normal link command transmissions 232 on the USB USB link 122 of FIG. 1. Generally, the USB port transmitter 104 is permitted to transmit at will. However, certain restraints, such as initialization, flow control, or low power state restraints, may require the USB port transmitter 104 to wait to transmit a transmission. Flow proceeds to block 304.

At block 304, each of the first-level arbiters 234 of FIG. 2 examines the normal link commands scheduled for transmission from the pool 232 of FIG. 2 and selects one of the normal link commands for transmission. Each first-level arbiter 234 uses its respective priority rule (i.e., one of the priority rules from Tables 3 and 4 above) to select its normal link command. Each first-level arbiter 234 outputs the selected normal link command on its respective output 254-3 and 254-4 of FIG. 2, each of which is provided to the first-level multiplexer 236 of FIG. 2. Flow proceeds to block 306.

At block 306, the first-level multiplexer 236 selects one of the inputs 254-3 or 254-4 as the granted normal link command 258. Specifically, the first-level multiplexer 236 selects as the granted normal link command 258 the one of the first-level arbiters 234-3 or 234-4 specified by the output 256 of the first-level control register 238. The granted normal link command transmission 258 is provided to each of the second-level arbiters 204. Flow proceeds to block 308.

At block 308, each of the second-level arbiters 204 of FIG. 2 examines the granted normal link command transmission 258 and the SKP ordered set, header/data packet, and special link command transmissions scheduled for transmission from the pool 202 of FIG. 2 and selects one of the transmissions for transmission. Each second-level arbiter 204 uses its respective priority rule (i.e., one of the priority rules from Tables 1 and 2 above) to select the transmission. Each second-level arbiter 204 outputs the selected transmission on its respective output 224-1 and 224-2 of FIG. 2, each of which is provided to a respective input of the second-level multiplexer 206 of FIG. 2. Flow proceeds to block 312.

At block 312, the second-level multiplexer 206 selects one of the inputs 224-1 or 224-2 as the final granted transmission 212. Specifically, the second-level multiplexer 206 selects as the final granted transmission 212 the one of the second-level arbiters 204 specified by the output 226 of the second-level control register 208. Flow ends at block 312.

Figure 4:
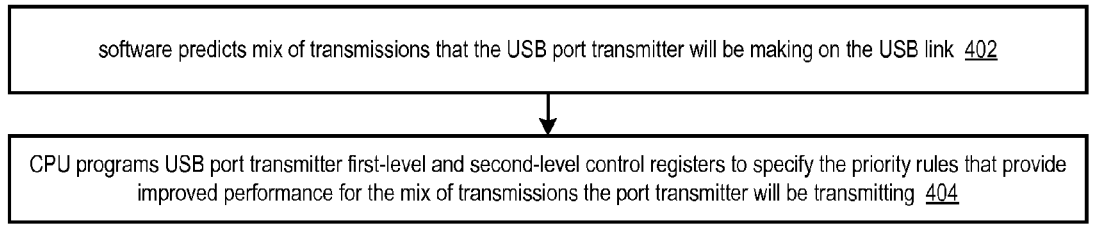
FIG. 4 is a flowchart illustrating the programmability of the first-level control register and the second-level control register of FIG. 2 according to an embodiment of the present invention.

Referring now to FIG. 4, a flowchart illustrating the programmability of the first-level control register 238 and the second-level control register 208 of FIG. 2 according to an embodiment of the present invention is shown. Flow begins at block 402.

At block 402, an entity predicts that a particular combination of one of the Priority Rule of Table 1 and Table 2 and one of the Priority Rule of Table 3 and Table 4 will yield the best performance for a mix, or stream, of transmission types that the USB port transmitter 104 of FIG. 2 will be transmitting on the USB link 122 in the future. The predicting entity may be system software, such as a device driver executing on the system CPU. The predicting entity may be another USB device in the USB network that includes the USB device 100 of FIG. 1; or, the predicting entity may be the software controlling the other USB device. The USB device 100 of FIG. 1 may be a USB host, USB hub, or USB peripheral device. Flow proceeds to block 404.

At block 404, the predicting entity programs the first-level control register 238 and the second-level control register 208 of FIG. 2 with the specific values to select the appropriate Priority Rules that are likely to provide the best performance for the mix of transmissions that the USB port transmitter 104 will be transmitting in the future. Flow ends at block 404.

As may be observed from the forgoing, the flexibility provided by the embodiments described herein through the ability to select from among a plurality of priority rules to select a USB transmission to transmit from among multiple USB transmissions of different types may result in better performance than a USB port transmitter that always employs the same single priority rule.

Although various embodiments have been described in which the port transmitter may employ a particular number of levels (two according to one embodiment) and a particular number of priority rules in each level (two according to one embodiment), other numbers of levels and priority rules are contemplated, and the invention is not limited to a particular number. Finally, although embodiments have been described particular priority rules, other priority rules are contemplated, and the invention is not limited to the particular priority rules described. For example, although an embodiment has been described in which LGOOD_n normal link commands are prioritized ahead of LCRD_x normal link commands, embodiments are contemplated in which LCRD_x normal link commands are prioritized ahead of LGOOD_n normal link commands. For another example, although an embodiment has been described in which the special link command type transmissions (LUP link commands) are included in the pool of transmissions prioritized by the second-level arbiters, embodiments are contemplated in which the special link command type transmissions are included in the pool of normal link command type transmissions.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core or chipset core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device or chipset device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A Universal Serial Bus (USB) port transmitter for transmitting USB transmissions on a USB link, the USB port transmitter comprising:
a plurality of arbiters, each configured to employ a distinct priority rule to select one USB transmission from among multiple scheduled USB transmissions based on the types of the multiple scheduled USB transmissions; and
a selector, coupled to the plurality of arbiters, the selector configured to select one of the plurality of arbiters to select the one USB transmission from among the multiple scheduled USB transmissions to transmit on the USB link.

2. The USB port transmitter of claim 1, further comprising:

a storage element, coupled to the selector, the storage element configured to provide a value to the selector to control the selector to select the one of the plurality of arbiters.

3. The USB port transmitter of claim 2, wherein the storage element is programmable during operation of the USB port transmitter.

4. The USB port transmitter of claim 1, wherein the USB transmissions include SKP ordered sets, link commands, and header/data packets.

5. The USB port transmitter of claim 1, wherein the distinct priority rule employed by at least a first of the plurality of arbiters prioritizes header/data packet type transmissions higher than link command type transmissions, and wherein the distinct priority rule employed by at least a second of the plurality of arbiters prioritizes link command type transmissions higher than header/data packet type transmissions.

6. The USB port transmitter of claim 5, wherein the distinct priority rule employed by the at least a second of the plurality of arbiters prioritizes flow control and power management link command type transmissions higher than header/data packet type transmissions.

7. The USB port transmitter of claim 1, wherein the distinct priority rule employed by at least a first of the plurality of arbiters prioritizes USB LGO_Ux link command type transmissions higher than USB LAU/LXU link command type transmissions, and wherein the distinct priority rule employed by at least a second of the plurality of arbiters prioritizes USB LAU/LXU link command type transmissions higher than USB LGO_Ux link command type transmissions.

8. The USB port transmitter of claim 1, wherein the distinct priority rule employed by at least one of the plurality of arbiters prioritizes flow control link command type transmissions higher than power management link command type transmissions.

9. A method for a Universal Serial Bus (USB) port to transmit USB transmissions on a USB link, the method comprising:
    selecting one priority rule from among a plurality of distinct priority rules, wherein each of the plurality of distinct priority rules includes a distinct priority for each of a plurality of USB transmission types; and
    using the selected one of the plurality of distinct priority rules to select one USB transmission from among multiple scheduled USB transmissions for transmission on the USB link.

10. The method of claim 9, further comprising:
    programming a value into a storage element of the USB port prior to said selecting the one priority rule, wherein the value specifies the one priority rule.

11. The method of claim 1, wherein at least a first of the plurality of distinct priority rules prioritizes header/data packet type transmissions higher than link command type transmissions, and wherein at least a second of the plurality of distinct priority rules prioritizes link command type transmissions higher than header/data packet type transmissions.

12. The method of claim 11, wherein the at least a second of the plurality of distinct priority rules prioritizes flow control and power management link command type transmissions higher than header/data packet type transmissions.

13. The method of claim 1, wherein at least a first of the plurality of distinct priority rules prioritizes USB LGO_Ux link command type transmissions higher than USB LAU/LXU link command type transmissions, and wherein at least a second of the plurality of distinct priority rules prioritizes USB LAU/LXU link command type transmissions higher than USB LGO_Ux link command type transmissions.

14. The method of claim 1, wherein at least one of the plurality of distinct priority rules prioritizes flow control link command type transmissions higher than power management link command type transmissions.

15. A Universal Serial Bus (USB) port transmitter for transmitting USB transmissions on a USB link, the USB port transmitter comprising:
    a first plurality of arbiters, each configured to employ a distinct priority rule to select one USB link command transmission from among multiple scheduled USB link command transmissions based on the types of the multiple scheduled USB link command transmissions;
    a first selector, coupled to the first plurality of arbiters, the first selector configured to select one of the first plurality of arbiters to select the one USB link command transmission;
    a second plurality of arbiters, each configured to employ a distinct priority rule to select one USB transmission from among multiple scheduled USB transmissions based on the types of the multiple scheduled USB transmissions, wherein the multiple scheduled USB transmissions include the one USB link command transmission selected by the first selector and multiple header/data packet transmissions; and
    a second selector, coupled to the second plurality of arbiters, the second selector configured to select one of the second plurality of arbiters to select the one USB transmission from among the multiple scheduled USB transmissions to transmit on the USB link.

16. The USB port transmitter of claim 15, wherein the multiple scheduled USB transmissions also include USB SKP ordered set transmissions.

17. The USB port transmitter of claim 15, wherein the multiple scheduled USB link command transmissions exclude LUP link command transmissions, wherein the multiple scheduled USB transmissions include USB LUP link command transmissions.

18. The USB port transmitter of claim 15, wherein the multiple scheduled USB link command transmissions exclude LDN link command transmissions, wherein the multiple scheduled USB transmissions include USB LDN link command transmissions.

19. The USB port transmitter of claim 15, wherein the distinct priority rule employed by at least a first of the first plurality of arbiters prioritizes USB LGO_Ux link command type transmissions higher than USB LAU/LXU link command type transmissions, and wherein the distinct priority rule employed by at least a second of the first plurality of arbiters prioritizes USB LAU/LXU link command type transmissions higher than USB LGO_Ux link command type transmissions.

20. The USB port transmitter of claim 15, wherein the distinct priority rule employed by at least a first of the second plurality of arbiters prioritizes USB header/data packet type transmissions higher than USB link command type transmissions, and wherein the distinct priority rule employed by at least a second of the second plurality of arbiters prioritizes USB link command type transmissions higher than USB header/data packet type transmissions.

21. The USB port transmitter of claim 20, wherein the distinct priority rule employed by the at least a second of the second plurality of arbiters prioritizes USB flow control and power management link command type transmissions higher than header/data packet type transmissions.

22. The USB port transmitter of claim 15, wherein the distinct priority rule employed by at least one of the first plurality of arbiters prioritizes USB flow control link command type transmissions higher than USB power management link command type transmissions.

23. The USB port transmitter of claim 15, further comprising:
   a first storage element, coupled to the first selector, configured to provide to the first selector a first value to control the first selector to select the one of the first plurality of arbiters; and
   a second storage element, coupled to the second selector, configured to provide to the second selector a second value to control the second selector to select the one of the second plurality of arbiters.

24. The USB port transmitter of claim 23, wherein the first and second storage elements are dynamically programmable during operation of the USB port transmitter.

25. A method for a Universal Serial Bus (USB) port to transmit USB transmissions on a USB link, the method comprising:
   selecting one priority rule from among a first plurality of distinct priority rules, wherein each of the first plurality of distinct priority rules includes a distinct priority for each of a plurality of USB link command transmission types;
   using the selected one of the first plurality of distinct priority rules to select one USB link command transmission from among multiple scheduled USB link command transmissions;
   selecting one priority rule from among a second plurality of distinct priority rules, wherein each of the second plurality of distinct priority rules includes a distinct priority for each of a plurality of USB transmission types; and
   using the selected one of the second plurality of distinct priority rules to select one USB transmission from among multiple scheduled USB transmissions to transmit on the USB link, wherein the multiple scheduled USB transmissions include the selected one USB link command transmission and multiple header/data packet transmissions.

26. The method of claim 25, wherein the multiple scheduled USB transmissions also include USB SKP ordered set transmissions.

27. The method of claim 25, wherein the multiple scheduled USB link command transmissions exclude LUP link command transmissions, wherein the multiple scheduled USB transmissions include USB LUP link command transmissions.

28. The method of claim 25, wherein the multiple scheduled USB link command transmissions exclude LDN link command transmissions, wherein the multiple scheduled USB transmissions include USB LDN link command transmissions.

29. The method of claim 25, wherein at least a first of the first plurality of distinct priority rules prioritizes USB LGO_Ux link command type transmissions higher than USB LAU/LXU link command type transmissions, and wherein at least a second of the first plurality of distinct priority rules prioritizes USB LAU/LXU link command type transmissions higher than USB LGO_Ux link command type transmissions.

30. The method of claim 25, wherein at least a first of the second plurality of distinct priority rules prioritizes USB header/data packet type transmissions higher than USB link command type transmissions, and wherein at least a second of the second plurality of distinct priority rules prioritizes USB link command type transmissions higher than USB header/data packet type transmissions.

31. The method of claim 30, wherein the at least a second of the second plurality of distinct priority rules prioritizes USB flow control and power management link command type transmissions higher than header/data packet type transmissions.

32. The method of claim 25, wherein at least one of the first plurality of distinct priority rules prioritizes USB flow control link command type transmissions higher than USB power management link command type transmissions.

33. The method of claim 25, further comprising:
   programming a first value into a first storage element of the USB port prior to said selecting one priority rule from among a first plurality of distinct priority rules, wherein the first value specifies the first plurality of distinct priority rules; and
   programming a second value into a second storage element of the USB port prior to said selecting one priority rule from among a second plurality of distinct priority rules, wherein the second value specifies the second plurality of distinct priority rules.

34. The method of claim 33, wherein said programming the first and second value is performed during operation of the USB port.

* * * * *